Patented Mar. 12, 1935

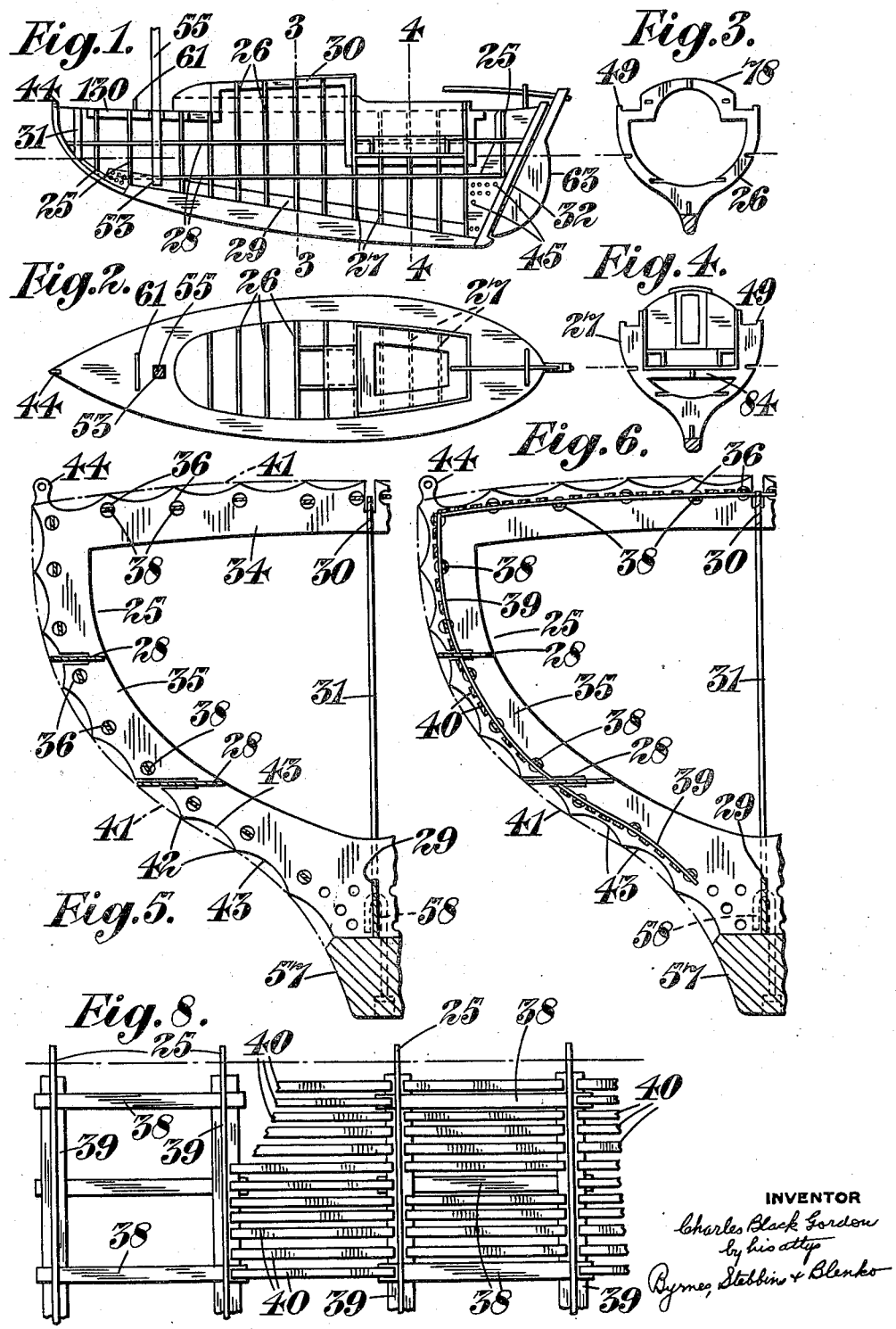

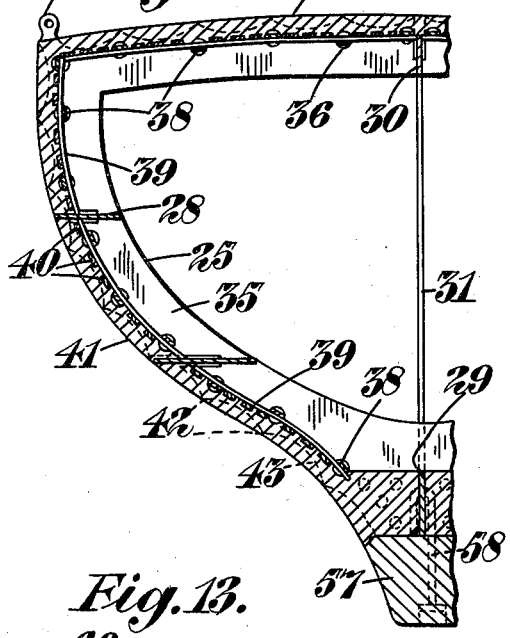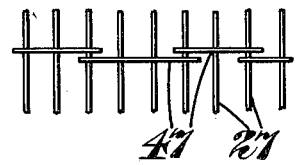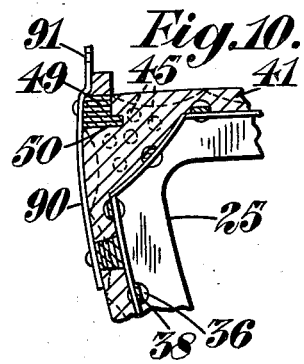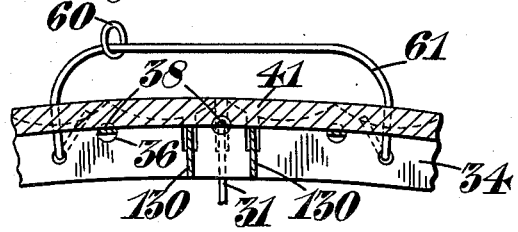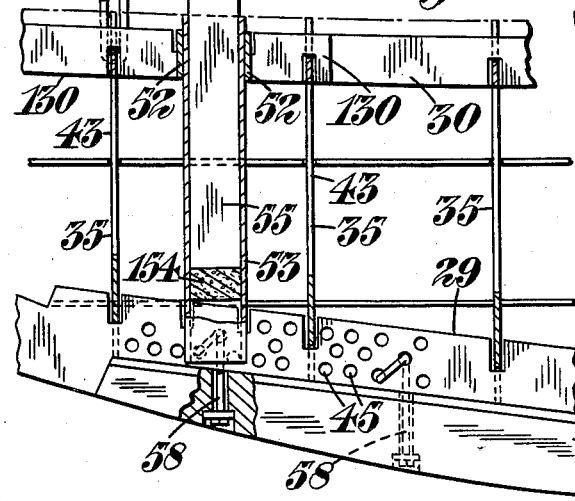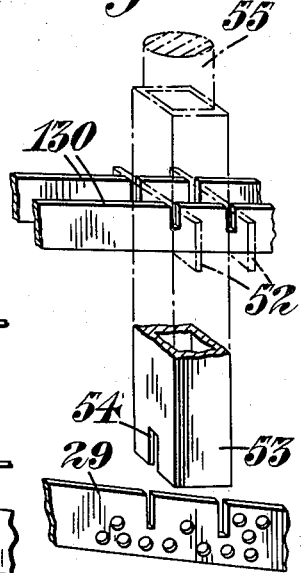

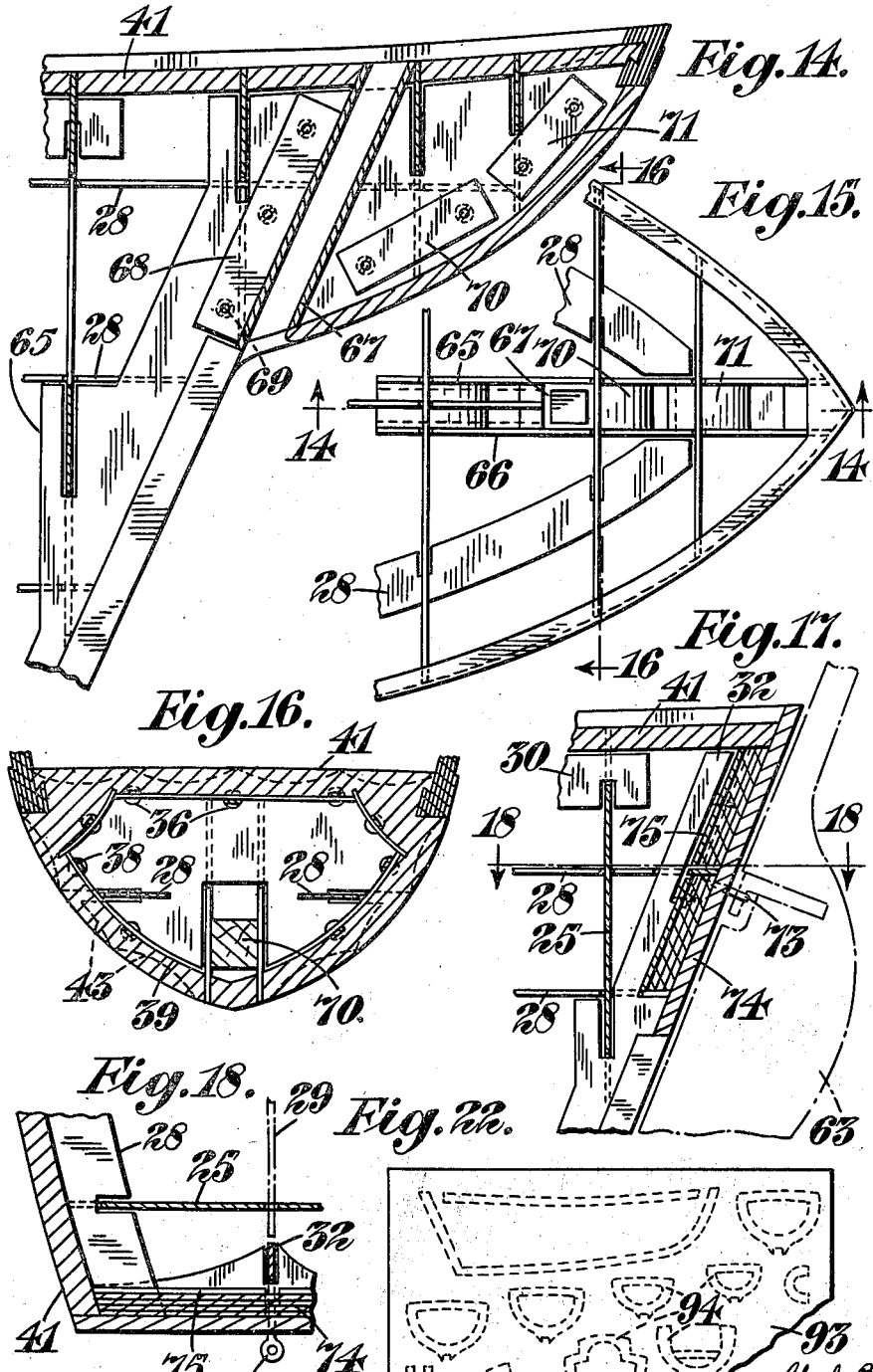

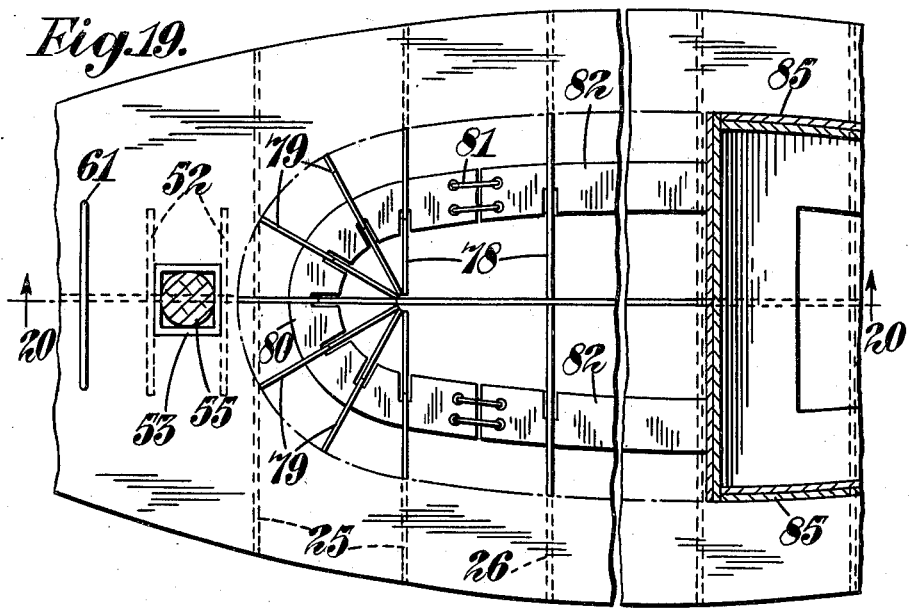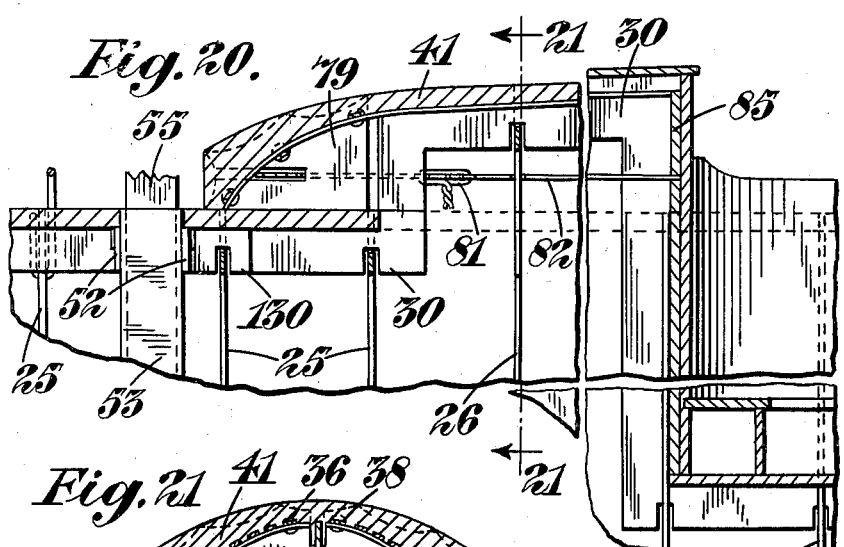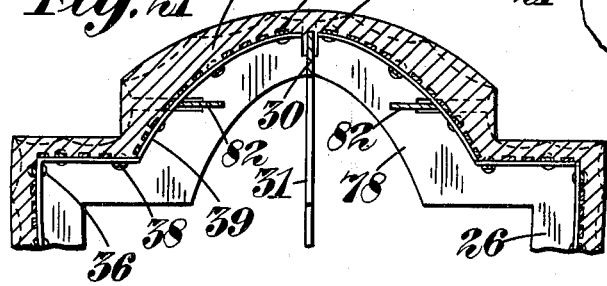

1,994,274

UNITED STATES PATENT OFFICE 1,994,274

MODEL WATERCRAFT AND AIRCRAFT

Charles Black Gordon, Dalbeattie, Scotland

Application May 1, 1934, Serial No. 723,348
In Great Britain May 18, 1933

15 Claims. (Cl. 46—37)

This invention comprises improvements in or relating to model watercraft and aircraft including boats, ships, yachts, barges, canoes and the fuselages of aeroplanes, hereinafter referred to generally as "boats".

The present invention has for one of its objects to provide constituent parts from which a model boat can be readily erected without the use of rivets, bolts, welding or the like for joining the constituent parts together.

According to the invention, there is provided apparatus for use in erecting a model boat or like vessel, comprising in combination a plurality of transverse frame members, for example of U-shape, constituting ribs, and a plurality of longitudinal frame members to be fixed thereto by a readily detachable connection for holding the same in spaced parallel relation, which transverse frame members each has a plurality of open-ended slots arranged spaced apart in their outer lateral marginal portions, each of which longitudinal frame members also has a plurality of open-ended slotted portions arranged each to be received by, and to embrace a slotted portion of a said transverse frame member. These transverse and longitudinal frame members are preferably made of sheet metal, and when assembled, provide a skeleton framework of the boat. The term "U-shape" is intended to cover members of U, V or like shape. The readily detachable connections avoid the use of rivets and welding, so that the parts can be assembled by young persons and others without any mechanical skill.

One of said longitudinal frame members to be secured to U-shaped transverse members at their closed ends constitutes the back-bone or keel with the stem and stern post of the boat to be erected. A heavy keel, e. g. of lead, may be secured in any convenient manner to the back-bone.

In order that the sides of the boat shall be correctly streamlined, one or more of the longitudinal frame members to be attached horizontally to the limbs of the U-shaped transverse members are shaped, according to the invention, according to the desired "water-line" contour of the boat to be erected. These horizontal frame members will also serve to hold the transverse frame members vertical. In addition, one or more of the longitudinal frame members which are to be attached to the upper parts of the transverse frame members are shaped, according to the invention, to define the fore-and-aft contour of the deck and upper parts of the boat to be erected.

Other features of the invention relating to apertures in the transverse frame members for receiving strips of material to constitute part of the side or deck of the boat to be erected, to interlaced strips for carrying an outer skin of the boat, and to a plastic material for use as the outer skin will be described hereinafter.

The invention is diagrammatically illustrated by way of example in the accompanying drawings, wherein:—

Figure 1 is a side elevation showing one form of framework of a model boat according to the invention having a pointed stern and having a cabin roof and cockpit, Figure 2 is a plan thereof, Figures 3 and 4 are diagrammatic vertical cross-sections taken on the line 3—3 and 4—4, respectively, in Figure 1 through the cabin roof and cockpit parts, Figures 5, 6 and 7 are detailed sectional elevations on an enlarged scale showing a portion of a transverse member and strips forming a foundation for the skin of the boat, and Figure 8 is a side elevation of a portion of the strip work foundation for the skin;

Figure 9 is a detail view showing a modified "water-line" horizontal member,

Figure 10 shows a gunwale in section,

Figures 11 and 12 are respectively a side elevation and perspective view showing a mast socket, and, Figure 13 is a detail view of a sheet traveller;

Figure 14 is a vertical section through a counter stern;

Figure 15 is a plan thereof and

Figure 16 is a vertical section taken on the line 16—16 in Figure 15;

Figure 17 is a vertical section of a square stern;

Figure 18 is a horizontal section taken on the line 18—18 in Figure 17;

Figure 19 is a plan on an enlarged scale of portions of the cabin roof and cockpit shown in Figure 1;

Figure 20 is a longitudinal section taken on the line 20—20 in Figure 19,

Figure 21 is a vertical section taken on the line 21—21 in Figure 20, and

Figure 22 shows a sheet of material described hereinafter.

Like reference characters designate like parts throughout the several views.

Referring to the drawings, the framework of the hull of a model boat shown in Figures 1 and 2 comprises a plurality of transverse frame members 25, 26, 27 constituting ribs, and a plurality of longitudinal frame members 28, 29, 30 fixed thereto for holding the same in spaced parallel relation, which members are arranged on the "backbone" and "rib" principle. These frame members may be made of any convenient material, but are preferably cut from a thin sheet of metal, as described hereinafter, and they may be oppositely recessed so as to interengage one with another where they cross one another and to be readily detachable. The ribs 25 are in the fore and after parts, while the ribs 26 are at or near the middle and the ribs 27 are situated towards the stern of the boat. These ribs 25, 26, 27 define the girth outlines of the model at regularly spaced positions along it. The longitudinal members 28 lie horizontally and are shaped to give the required horizontal "water-line" contour of the boat; the longitudinal member 29 constitutes the backbone and is provided with a stem frame 31 and a sternpost frame 32, and the longitudinal member 30 is a deck, cabin roof and cockpit beam and defines the fore and aft contour of the upper part of the boat.

As shown in Figures 5, 6 and 7, each transverse member 25 is of U shape, has a curved horizontal top portion 34 connecting the upper ends of its side limbs 35 for defining the deck of the boat, and is interengaged with the deck portion of beam 30. The limbs 35 have open-ended slots at their side edges and ends for receiving and interengaging with correspondingly slotted portions of the longitudinal members 28, 29.

In order to provide a foundation for the skin or shell of the boat, the ribs may be provided near their outer edges with a series of apertures 36 spaced equally apart along their side limbs and along their top portions, for receiving fore-and-aft strips of material 38 in the form of laths to constitute part of the side or deck of the boat, as shown in Figures 5, 6 and 7. These strips 38 constitute miniature beams and extend between the two ribs of adjacent pairs of transverse frames, as shown most clearly in Figure 8. A plurality of seating strips 39, also in the form of laths, are carried in spaced relation by, and interlaced with, the strips 38 at opposite sides of the ribs, and a plurality of covering strips 40 constituting miniature planks, also in the form of laths, are carried horizontally in close parallel relation by the seating strips 39. This strip work foundation may be secured together in any convenient manner, as by gluing together the laths where they cross one another. The covering strips 40 may be spaced about $\frac{1}{16}$ inch apart so that the plastic material providing the skin may flow between them and be interlocked into position.

The outer skin or shell may be constituted by plastic material 41 to be applied to the strips 40, as shown in Figure 7. In order that the plastic material may be applied to the desired thickness, those outer portions of the frame members which are to have a plastic outer shell applied to them are so formed as to provide a series of projections 42 or points separated by recesses 43 for defining the finished surface contour of the outer skin or shell of the boat. The outer edges of the ribs and some or all of the longitudinal members, particularly the load water-line longitudinal members, thus have a scalloped formation. In some cases, the outside edges of the frame members that are to lie flush with the outer shell may be bevelled or formed as a knife-edge in order that the visible blunting or thickening of the knife edge may indicate where excessive removal of finished surface by sandpapering occurs. Further, at some parts of the framework where it is inconvenient to apply the described foundation, the frame members may be perforated, as shown at 45 in Figures 1, 10 and 11 for keying a plastic mass in position. The projections and recesses, when provided may be of various shapes and forms for example rounded, square, pointed or otherwise. The transverse members and the stem member may have eyes 44 at their upper corners for fixing rigging or mast stays.

For forming the plastic material, a thick paste may be prepared with fine damp sawdust and a liquid adhesive, e. g. dilute glue, which may be applied to the lath foundation by a suitable tool, such as a palette knife. Preferably several thin layers of the plastic material are applied in succession after the previous one has dried. The projections on the edges of the frame members will indicate the depth of the plastic material which, when quite dry and hard, may be smoothed with sandpaper and then painted. Any other convenient plastic material, however, may be used.

As shown in Figure 9, instead of the horizontal "water-line" members 28 being continuous from end to end of the boat, if desired they may be in shorter lengths 47 arranged in staggered relation in a vertical direction.

As shown in Figure 10, a wooden gunwale 49 may be carried in rebates 50 in the transverse members at their upper corners.

If desired, two deck beams 130 may be provided along part of the deck spaced apart in parallel relation as shown in Figures 11 and 12, to facilitate the provision of a mast socket. Such a socket may be a tube 53 of square section held in position by two cross pieces 52 spaced apart in parallel relation and arranged to be interengaged by means of oppositely directed slots with the pair of deck beams 130. The bottom end of the socket 53 may have a recess 54 to fit over the backbone 29, and the mast 55 may rest on a cork filling 154 at the bottom of the socket. The backbone 29 may have a leaden keel 57 secured to it in any convenient manner, as by nut-equipped bolts 58 having a hooked end passed through perforations in the backbone, as shown in Figure 11.

Figure 13 shows a sheet traveller comprising a ring 60 slidable along a wire 61 having its ends inserted through holes in a curved horizontal portion 34 of a transverse frame member.

The boat shown in Figures 1 and 2 has a pointed or sharp stern, and has the edge of its stern frame covered at either side with strips of wood fixed with glue to form the stern post for carrying a rudder 63. Instead of the stern being pointed, however, it may be of some other type, for example, of the counter type having a rudder trunk, or of the square type without a counter.

The counter stern shown in Figures 14, 15 and 16 is formed as a separate unit and comprises two fore-and-aft contour membres 65, 66, a rudder trunk 67 in the form of a tube of square cross-section being fixed between them and held at the foot by a rebate or notch in the stern frame. The connection of the counter unit to the stern frame may be effected by means of wooden packing pieces 68 to which they are both fixed by screws 69. Other wooden packing pieces 70, 71 may be provided as shown.

In Figures 17 and 18 showing a square stern, a rudder 63, indicated in broken lines, may be carried by eyelets 73 screwed into an upper wooden stern piece 74 attached by screws to a sloping plate 75 carried by the stern-post frame 32 and also into the stern post at a lower level.

Referring to Figures 19, 20 and 21 showing the cabin roof and cockpit on a larger scale than in Figure 1, each transverse frame member 26 has its top portion 78 of curved or arched formation as shown in Figure 21. The rounded forward end of the cabin roof may be formed by means of frame members 79 which radiate from the front of the vertical break in the longitudinal frame member 30 immediately over one of the transverse frames 25 on Figures 19 and 20 and are connected by means of opposed recesses or slots with a semi-elliptical or otherwise shaped horizontal frame member 80 which, after the radiating members 79 have been assembled, is secured in any convenient manner e. g., by wire ties 81, to the ends of a pair of longitudinal horizontal members 82 carried by the top portions 78 of the transverse frame members 26. The roof of the cabin may be formed as described above of a strip work foundation provided with a plastic skin.

To provide the well for a cockpit, the transverse frame members 27 shown in Figure 4 are used. These members of U-shape have a cross-piece 84 between their free ends and the closed end of the U for defining the well for the cockpit structure which is a separate unit and may be formed of plywood with its sides, ends and bottom suitably jointed together. The sides and ends of the cockpit may be carried above deck level as coamings, thickened on the outside above the deck level as shown at 85 to cover the joint between the cockpit unit and the finished deck surface. The cockpit unit may be varnished or painted over both inside and outside before being placed in position, and the joints between it and the adjacent parts of the model may be rendered watertight by the use of putty, paint or other suitable material.

Provision may be made for fixing a bowsprit. Also chain plates, each in the form of a metal strip 90 having an eyelet 91 at its end as shown in Figure 10, may be provided.

Instead of providing a cabin roof and a cockpit, the deck may be run continuously at the same level from end to end of the boat, in which case frame members 25 will be used instead of the frame members 26 and 27.

In order readily to make the transverse and longitudinal frame members and other component parts of the model boat, a sheet of convenient material, e. g., metal, may be provided, scored, incised or otherwise marked to indicate two or more parts of different kinds or a plurality of parts of the same kind which can be readily cut out of the sheet and will then constitute parts for use in assembling the boat. Such a sheet 93 is shown in Figure 22, various component parts being indicated in broken lines at 94.

The described constituent elements for assembling model boats can be made in large quantities at a low cost, and enable model boats of correct shape and formation to be readily erected without difficulty by any person desiring to do so.

Various modifications may be made in the details of construction described above without departing from the invention. For example, model water-craft of other forms such as ships, yachts, barges and canoes, and also the fuselages of aeroplanes may be constructed in an analogous manner.

I claim:

1. Apparatus for use in erecting a model boat or like vessel, comprising in combination a plurality of transverse frame members constituting ribs, one or more longitudinal frame members to be fixed thereto for holding the same in spaced parallel relation, which transverse frame members have apertures spaced apart along their side limbs, and a plurality of fore-and-aft strips of material constituting miniature beams to be threaded through said apertures.

2. Apparatus as set forth in claim 1, in combination with a plurality of seating strips of material to be carried in spaced relation by the fore-and-aft strips so as to lie transversely thereof for constituting part of the side or deck or upper parts of the vessel.

3. Apparatus as set forth in claim 1, in combination with a plurality of seating strips of material to be carried in spaced relation by the fore-and-aft strips so as to lie transversely thereof, and a plurality of covering strips of material to be carried in close parallel relation by said seating strips.

4. Apparatus for use in erecting a model boat or like vessel, comprising in combination a plurality of transverse frame members constituting ribs, and one or more longitudinal frame members to be fixed thereto for holding the same in spaced parallel relation, those outer portions of the frame members which are to have a plastic outer shell applied to them being so formed as to provide a series of projections separated by recesses for defining the finished contour of the outer skin or shell of the vessel to be erected.

5. Apparatus for use in erecting a model boat or like vessel, comprising in combination a plurality of transverse frame members constituting ribs, and one or more longitudinal frame members to be fixed thereto for holding the same in spaced parallel relation, the edges of outer portions of frame members that are to lie flush with an outer shell provided by plastic material being bevelled or formed as a knife-edge.

6. A model boat or like vessel comprising in combination a plurality of transverse frame members constituting ribs, a plurality of longitudinal frame members fixed thereto for holding the same in spaced parallel relation, a plurality of fore-and-aft strips of material constituting miniature beams threaded through apertures spaced apart along the side limbs of the transverse members, seating strips carried transversely by the miniature beams, covering strips carried in close parallel relation by the seating strips, and plastic material providing an outer skin or shell carried by the covering strips.

7. Apparatus for use in erecting a model boat or like vessel, comprising in combination a plurality of U-shaped transverse frame members constituting ribs, and one or more longitudinal frame members to be fixed thereto for holding the same in spaced parallel relation, some of which transverse members have each an upwardly curved portion connecting the ends of its limbs remote from the closed end of the U for defining a roof of a cabin.

8. Apparatus for use in erecting a model boat or like vessel, comprising in combination a plurality of U-shaped transverse frame members constituting ribs, and one or more longitudinal frame members to be fixed thereto for holding the same in spaced parallel relation, some of which transverse members have a cross-piece between their free ends and the closed end of the U for defining the bottom of a well for a cockpit.

9. Apparatus for use in erecting a model boat or like vessel, comprising in combination a plurality of U-shaped transverse frame members constituting ribs, and a plurality of longitudinal frame members to be fixed thereto for holding the same in spaced parallel relation, one of which longitudinal members constitutes a fore-and-aft deck beam having an upper portion for defining the roof of a cabin and a lower portion defining the bottom of the well for a cockpit.

10. Apparatus as set forth in claim 9, in combination with a cockpit structure to be carried by the transverse and longitudinal members.

11. Apparatus for use in erecting a model boat or like vessel, comprising in combination a plurality of U-shaped transverse frame members constituting ribs, a plurality of longitudinal frame members to be fixed thereto for holding the same in spaced parallel relation, two fore-and-aft deck beams spaced apart in parallel relation and arranged to be interengaged with curved horizontal portions of the transverse members, and two cross-pieces spaced apart in parallel relation and arranged to be interengaged with said deck beams to receive a tube constituting a mast socket.

12. Apparatus for use in erecting a model boat or like vessel, comprising in combination a plurality of transverse frame members constituting ribs, and a plurality of longitudinal frame members to be fixed thereto by a readily detachable connection for holding the same in spaced parallel relation, which transverse frame members each has a plurality of open-ended slots arranged spaced apart in their outer lateral marginal portions, each of which longitudinal frame members also has a plurality of open-ended slotted portions arranged each to be reecived by, and to embrace a slotted portion of a said transverse frame member.

13. Apparatus for use in erecting a model boat or like vessel, comprising in combination a plurality of vertical transverse frame members constituting ribs, and a vertical longitudinal frame member and a plurality of horizontal longitudinal frame members to be fixed thereto by a readily detachable connection for holding the same in spaced parallel relation, which transverse frame members each have a plurality of open-ended slots arranged spaced apart in their outer marginal portions, each of which longitudinal frame members also has a plurality of open-ended slotted portions arranged each to be received by, and to embrace a slotted portion of a said transverse frame member, which vertical longitudinal frame member constitutes a back-bone.

14. Apparatus as defined by claim 12 for use in erecting a model boat or like vessel, characterized in that some of said longitudinal frame members are arranged to lie horizontally when attached to the limbs of the transverse members, and have their outer edges shaped according to the desired "water-line" contour of the boat to be erected.

15. Apparatus for use in erecting a model boat or like vessel, comprising in combination a plurality of vertical transverse frame members constituting ribs, and a plurality of longitudinal frame members to be detachably fixed thereto for holding the same in spaced parallel relation, one or more of which longitudinal members to be attached horizontally to the limbs of the transverse members are shaped according to the desired "water-line" contour of the boat to be erected, one or more of the longitudinal members which are to be attached horizontally to the upper ends of the transverse frame members are shaped to define the fore-and-aft contour of the deck and upper parts of the vessel to be erected, and one of which longitudinal members constitutes a back-bone, which transverse and longitudinal members have open-ended slots at their edges to permit them to interengage with one another at points of intersection.

CHARLES BLACK GORDON.